WILHELM GOHLKE
PETER GEILING
INVENTORS

BY Mestern, Ross & Mestern

WILHELM GOHLKE
PETER GEILING
INVENTORS

United States Patent Office 3,326,087
Patented June 20, 1967

3,326,087
HYDRAULIC CONTROL SYSTEM
Wilhelm Gohlke, Frankfurt-Sportfeld, and Peter Geiling, Frankfurt-Bonames, Germany, assignors to Alfred Teves Maschinen- und Armaturenfabrik KG, Frankfurt am Main, Germany, a corporation of Germany
Filed Dec. 11, 1963, Ser. No. 329,796
Claims priority, application Germany, Mar. 1, 1963, T 23,542
5 Claims. (Cl. 91—275)

Our present invention relates to hydraulic installations having electrical control systems and, more particularly, to control systems of this character adapted to be intermittently energized by an actuating element.

In the commonly assigned copending application Ser. No. 325,960 filed November 26, 1963, by Franz Köhl and entitled, "Hydraulic Control Device," now U.S. Patent No. 3,169,450, there is disclosed a system wherein a hydraulic control unit is differentially operated by hydraulic pressure to reciprocate a piston member and concurrently actuate an electromechanical switching device to provide the control signals for the system. In this copending application, the piston member was constituted as a valve element shiftable against the force of a spring in accordance with the pressure differential between a source of fluid pressure and a working element, e.g. a hydraulic cylinder, to alternately permit the flow of fluid under pressure to the working unit and block substantial flow of fluid thereto. This control device operated in conjunction with an electromagnetic distributing-valve means, which was energized upon actuation of the switch means by the piston member, for intermittently reversing the flow of fluid to the working element. Prior to the development described in the aforementioned copending application, the control signals for installations of this type were frequently derived from timer means in response to the hydraulic fluid flow or pressure or from manual operation of a switching device. In some cases, electronic control means were provided to effect reversal of the flow of fluid to the fluid responsive working element.

It is the principal object of the present invention to extend the principles of the aforementioned copending application and provide improved control means in a hydraulic installation of the general character described.

It is another object of our invention to provide improved means for generating electrical control pulses in a control system of a hydraulic installation.

A further object of the present invention is to provide means responsive to the parameter of a hydraulic fluid flow for generating electrical signals.

Still another object of the invention is to provide a hydraulic installation having an electronic unit triggerable by electrical signals for regulating the flow of fluid to a fluid-responsive working element.

These objects, and others which will become apparent hereinafter, are attained in accordance with the present invention by providing a control unit for a fluid-pressure installation which comprises an actuating member displaceable by the fluid relatively to a housing member, at least one of these members being provided with magnetic means while the other member is provided with coil means adapted to intercept the magnetic field of the magnetic means for generating an electrical current pulse upon relative displacement of the members in response to the flow or pressure of the fluid. We have found that a hydraulic installation, comprising a source of fluid under pressure and a working element connected with this source, can advantageously have a valve unit in hydraulic circuit with the source and the working element, this control unit having a longitudinally shiftable valve member displaceable by the action of the fluid is operable intermittently to pass fluid from the source to the working element and simultaneously to generate the electrical control pulses. To this end, the valve member may constitute the magnetic means while an induction coil is fixedly positioned with respect to the valve member and in intercepting relationship to the magnetic field thereof to generate the electrical signals in the induction coil, these signals being then amplified (e.g. via a transistor circuit) for operation of further electrical devices. According to one aspect of the present invention, the electrical devices can include an electronic control device for intermittently reversing the flow of fluid to the cylinder or register means for indicating the direction of displacement of the valve mmebr. The magnetic member may be permanently magnetized or constituted as a magnetically permeable body under the influence of an external magnetic field. Thus the valve member can be a ferromagnetic element having an energizing coil mounted thereon or coaxial therewith for generating the magnetic field, this energizing coil being movable with the magnetically permeable member or shiftable relatively thereto. Alternatively, the induction coil or a portion thereof can constitute the energizing means for magnetizing the permeable body, the electrical signal being then superimposed upon the direct current energizing potential. In yet another construction, the magnetic means are disposed in the stationary or housing portions of the control valve while the induction coil is carried by the movable member.

According to a more specific feature of the present invention the control element of the valve forms a magnetic coil surrounded by an induction coil built into the valve body. It is, however, possible according to this invention, to provide the induction coil externally of the valve body in which case the magnetizable core is connected with the valve member for reciprocation thereby. Furthermore, the valve member itself can be operated by fluid-responsive piston means externally of the valve, by a fluid-pressure differential developed across the valve member or by the rate of flow of the fluid through the valve. The electrical signals in the form of search or impulse current can then be amplified, preferably by means of a transistor circuit and passed through an electronic control unit; the latter may be of the bistable type whose two outputs operate respective electromagnetic means of one or more distributing valves for alternately changing the direction of fluid flow between the source of fluid under pressure and the working element. This distributing valve means may, as illustrated in the aforementioned copending application, be a single two-position electromagnetic valve or a pair of such valves for periodically reversing fluid flow to the working elements.

More specifically, the control valve can be provided with a valve member normally blocking the flow of fluid between the source and the working element but periodically subjected to a pressure differential tending to displace the valve member into a position in which fluid is passed to the working element against the force of a restoring spring. The latter can be effective to bias the member into its blocking position upon equalization of pressure on opposite sides of the valve. Alternatively the valve member can be constituted as a piston having a substantially frustoconical piston head adapted to bear upon a valve seat of complementary configuration. Upon development of a fluid pressure differential sufficient to lift the head from the seat, an augmented flow of pressure fluid past the valve member results in a pressure reduction at the downstream side of the member to accelerate the valve member into its open position. Throttling means can be provided to control the rate of which the valve member is shifted.

Accordingly it is an important feature of this invention that means be provided for accelerating the magnetic member with respect to the induction coil during a portion of the valve stroke in order to increase the magnitude of the control signal whose amplitude is a function of the rate of displacement of the magnetic member with respect to the coil.

The above and other objects, features and advantages of the present invention will become more readily apparent from the following description, reference being made to the accompanying drawing in which.

Figure 1:
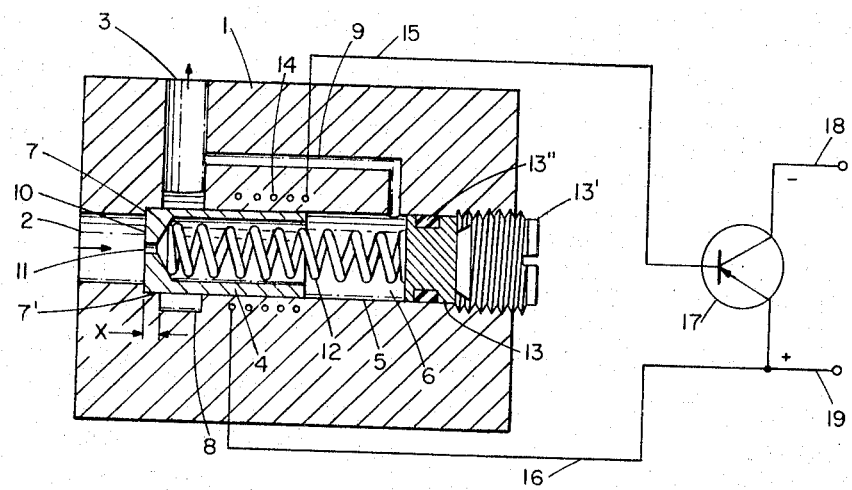
FIG. 1 is an axial cross-sectional view through a hydraulic control unit representing one embodiment of the invention.

In FIG. 1 we show a valve body 1 having an inlet 2 connected to a source of fluid pressure (not shown) and an outlet 3, transverse to this inlet, connectable to a working element such as a fluid-responsive cylinder or motor. The valve member 4 of the control unit is axially displaceable within a valve body 5 and can seat with its head 10 against an annular sealing surface 7 surrounding inlet 2. The diameter of head 10 is greater than that of inlet 2 so that the effective surface area of the head increases as the valve member 4 is displaced to the right and is removed from contact with the valve seat 7. A bore 7', concentric with inlet 2, slidably receives the valve member 4 in the closed condition of the valve and overlies the latter along an axial distance $x$, the valve member being displaced by this distance to "crack" or open the valve. The valve body 1 is also provided with an annular groove 8 communicating with outlet 3 and surrounding the valve member 4 to provide the low-pressure chamber of this valve. This low-pressure chamber is connected via a passage 9 to a compartment 6 formed by bore 5 at the rear side of the piston 4, which is tubular and receives a compression ring 12, the latter bearing upon the valve member 4 in a direction counter to the direction of displacement of this valve member under the force of the fluid. The valve member 4 is also provided with a throttling aperture 11 for bleeding fluid from the high-pressure valve chamber, constituted by inlet 2, to the low-pressure compartment 6. Spring 12 bears against an abutment 13 which is axially shiftable in the valve housing 1 by an adjusting screw 13' and has a seal 13'' which prevents leakage of the fluid.

The valve member 4 is constituted as an axially polarized permanent magnet which cooperates with the fixedly positioned induction coil 11 embedded in the housing surrounding the bore 5 and the valve member 4 reciprocable therein. Induction coil 14 is connected by leads 15 and 16 to the base/emitter input electrodes of a PNP transistor 17 whose collector and emitter constitute the output terminals, connectable via leads 18 and 19, respectively, to an electromagnetic control valve or indicating device as will be described subsequently with respect to FIG. 3.

When the pressure at inlet 2 equals the pressure at outlet 3, closure member 4 is urged against the valve seat 7 by the spring 12 whose restoring force can be adjusted by screw 13. When the pressure at outlet 3 reduces, e.g. as a consequence of a reversal in the connection of the chambers of a hydraulic working cylinder to the outlet 3, the pressure differential across the valve member 4 displaces the latter to the right against the force of spring 12. As the valve member 4 "cracks" the valve, i.e. when the valve member is withdrawn from engagement with the seat, the effective surface area of the valve member 4 increases and the latter is accelerated in its movement to the right. Since the high—and low—pressure compartments are constantly interconnected by the bleed aperture 11, no vacuum or pressure increase can develop during the course of valve movement. When the valve member 4 shifts by the distance $x$, a rapid flow of fluid takes place from inlet 2 to outlet 3 and the resulting Pitot effect decreases the pressure in compartment 6 via passage 9 so that the effective pressure differential across the valve member increases; the effect is a sudden acceleration of the valve member. This rapid movement of the magnetic valve member generates a current pulse in the induction coil 14, the pulse being amplified for transfer to the electronic control device. When the pressure rises at outlet 3, e.g. as a result of displacement of the working piston into an extreme position, the pressure differential is eliminated and spring 12 urges the valve member into contact with the seat. A similar valve-closing movement takes place when the pressure at inlet 2 is cut off by, for example, de-energizing the pump serving as a source of fluid pressure upon development of the control pulse. During the closing movement of the valve, valve member 4 is shifted to the left by spring 12 and a pulse of opposite polarity is generated in the induction coil.

Figure 2:
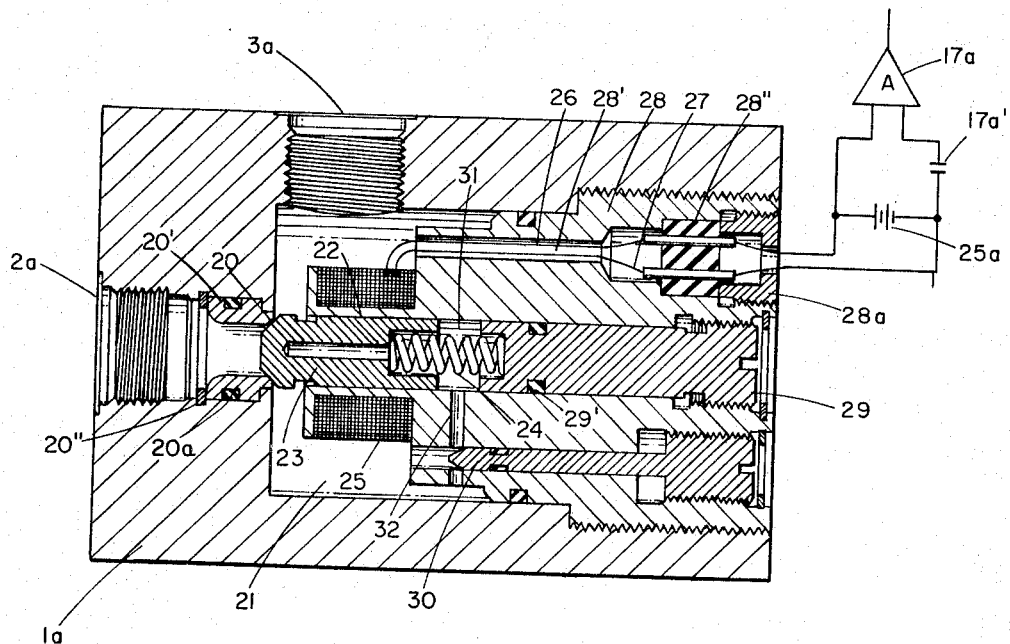
FIG. 2 is a similar view of an impulse generator according to another embodiment of the invention.

In FIG. 2 there is illustrated a further embodiment of the invention wherein the valve housing 1a is provided with inlet 2a and outlet 3a and a chamber 21 communicating between the inlet and the outlet. The valve member 23 is formed with a frustoconical valve head 20 having a larger diameter than the valve seat 20' engaged thereby; the seat is formed by an annulus held in place at inlet 2a by a snap ring 20'', a seal 20a being provided to prevent leakage of fluid. The shank portion of the valve member 23 is guided in the valve bore of a body portion 28 threaded into the chamber 21, the bore 22 being surrounded by a fixedly positioned induction and energizing coil 25 whose leads 26 and 27 extend through a passage 28' in valve body 28 and thence pass through an insulating seal 28'' held in place by a packing screw 28a. An axially adjustable abutment screw 29 is provided with a seal 29' for preventing escape of hydraulic fluid from the bore 22 of the valve and serves to adjust the restoring force of a compression spring 25 received within a compartment 31 at the rear of valve member 23 and urging the latter against the valve seat 20. Compartment 31 communicates with chamber 21 via a throttling bore 32 with which the needle valve 30, also axially shiftable in valve body 28, cooperates. A battery 25a is connected across the leads 26 and 27 of induction coil 25 for magnetizing the ferromagnetic valve member 23 and thus polarizes it axially so that, upon displacement of this valve member, a current pulse is generated in the induction coil. This current pulse is supplied to an amplifier 17a connected across the induction coil 25 via a direct-current blocking capacitor 17a. The output from amplifier 17a energizes an electronic control system as will be apparent hereinafter.

As long as the pressure differential between the inlet 2a and the outlet 3a is less that that necessary to shift the valve member 23 against the force of spring 24, the valve member remains in its closed position. When a pressure differential develops, however, the valve is cracked to expose the largest surface area of head 20 of the valve member to the pressure fluid, the valve member being then accelerated in its opening movement to the right. Needle valve 30 controls the rate of displacement of valve member 23 and thus the amplitude of the current pulse and the rate of repetition of the control system. Upon opening of the valve, the rapid flow of fluid along the head 20 into outlet 3a reduces the pressure behind this head and insures a further acceleration this time determined by the rate of flow of the fluid. When the fluid flow terminates, the pressure equalizes and valve member 23 is shifted into its closed position by spring 24.

Either of the valves described with reference to FIGS. 1 and 2 may be used in the hydraulic installation diagrammatically illustrated in FIG. 3. The valve 33 of this installation has an inlet 33a and an outlet 33b which are connected upon axial movement of the magnetic valve member 33c to the right against the force of a restoring spring 33d, a coil 33e being provided for induction of an electric pulse upon such movement of the valve member 33c. Passage 33f connects the rear side of valve member 33c with the low-pressure compartment of the valve in the manner illustrated in FIG. 1, the valve operating substantially as described with respect to this figure. In addition to the control device 33, the installation includes a hydraulic pump 34 serving as the source of fluid pressure. The pressure line 34' of this pump has a branch 34a connected to the inlet 33a of control valve 33 and supplies via branches 34b and 34c a pair of distributing valves 41 and 42 whose function will be described subsequently. Hydraulic fluid for the pump 34 is drawn from the low-pressure line 34'' and a sump 35 connected therewith. A pressure-relieving safety valve 43 is connected to the high-pressure side of pump 34 via conduit 34d and is designed to shunt fluid from the side of the pump to the sump conduit 34'' via line 34e.

Valves 41 and 42 are two-position devices having respective electromagnets 41', 41'' and 42', 42'' connected in parallel for displacing the closure members 41a and 42a between their extreme positions. In the left-hand position of closure member 41a, fluid under pressure of pump 34b can be communicated to a hdraulic cylinder 39' of another valve 39 to displace its piston 39'' and closure member 39a against the force of a spring 39b, the valve member 41a shunting fluid from cylinder 39' to the sump 35 over conduit 39c. Similarly, in the position of valve member 42a illustrated, the cylinder 40' of another valve 40 is relieved and emptied into the sump 35, thereby allowing the piston 40'' and the closure member 40a of this valve to be shifted via spring 40b. In the other position of valve member 42a, communication is established between pressure line 34c and cylinder 40'. Valves 39 and 40 serve as receiving devices for altering the direction of hydraulic fluid flow to the compartments 37 and 38 of a hydraulic cylinder 36 constituting the working element; the piston 36' of this cylinder being illustrated in its left-hand extreme position.

The leads 33g and 33h from induction coil 33e are connected to a transistor amplifier 44 as previously described, the amplified signal being fed to a bistable multivibrator 45 of a conventional type; this multivibrator acts as a counting stage in the electronic sense and having stable conditions wherein respective amplifiers 46a and 46b are activated to power the electromagnets 41'', 42'' and 41', 42' of valves 41 and 42. A switch 45' is provided in the electronic circuit 45 to initiate operation of the device.

Figure 3:
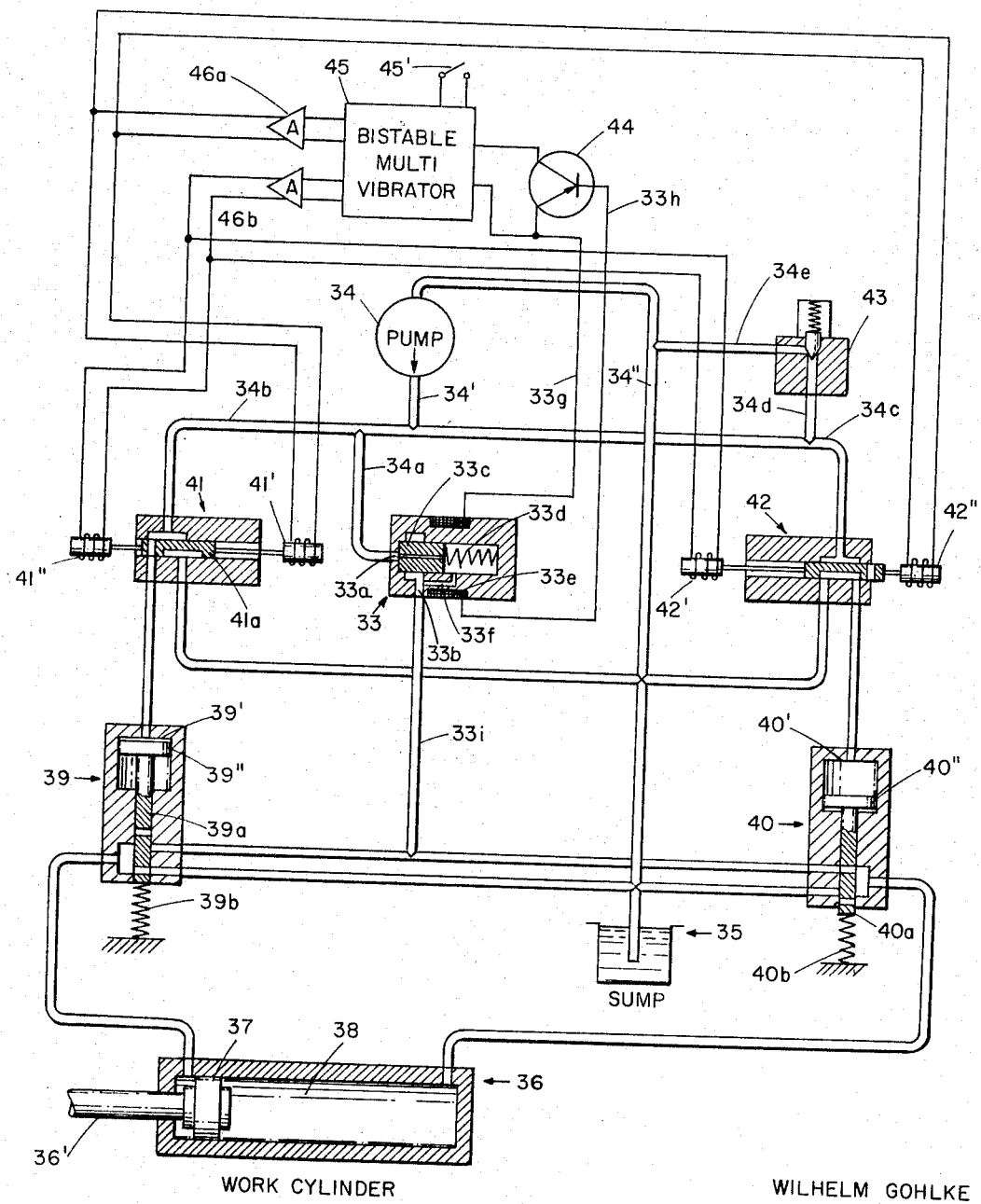
FIG. 3 is a diagram of a hydraulic installation provided with a control system according to the present invention.

With the installation in the condition illustrated in FIG. 3, except for valves 39 and 40, piston 36' has reached its maximum left-hand position so that the pressure in compartment 37 of cylinder 36 is substantially equal to that of the pressure side 34' of the pump, since valve 33 is connected via the pressure line 33i to the valves 39 and 40, and valve 39 communicates between compartment 37 and the sump 35. While compartment 38 is connected to the pressure line 33i by valve 40, there is no pressure differential across valve member 33c. Switch 45' is then closed to activate the solenoids 41'' and 42'' via amplifier 46a to shift the valve members 41a and 42a into their left-hand and right-hand extreme positions, respectively; fluid from pump 34 is then displaced via line 34' through valve 41 into cylinder 39' to shift the closure member 39a against the force of spring 39b and effect communication between chamber 37 and line 33i. Concurrently, valve member 42a connects cylinder 40' with the sump so that spring 40b displaces valve member 40a into its other extreme position to connect compartment 38 to the sump 35. The pressure in compartment 38 is thus relieved so that a pressure differential is established between inlet 33a and outlet 33b of control valve 33. The magnetic valve member 33c is thus displaced to the right so that fluid is fed from line 33i to the cylinder 36 in such sense as to displace the piston 36' to the right. The shift of valve member 33c, however, generates an electrical pulse in coil 33e, this pulse being fed via amplifier 44 to the bistable multivibrator 45 with hydraulic or electronic delay, if desired, to a de-energize amplifier 46b and shift the valve members 41a and 42a to the left, thereby relieving cylinder 39' and energizing cylinder 40'. Valve members 39a and 40a are then shifted to their other extreme positions, respectively to reverse the flow of fluid to cylinder 36 and effect pressurization of chamber 38 and depressurization of chamber 37. Piston 36' is then displaced to the left. Between displacements of the piston 36', valve member 33c is displaced by its spring 33d into a closed condition preparatorily to the development of a pressure differential across the valve. The repetition of this cycle continues as long as is desirable.

Figure 4:
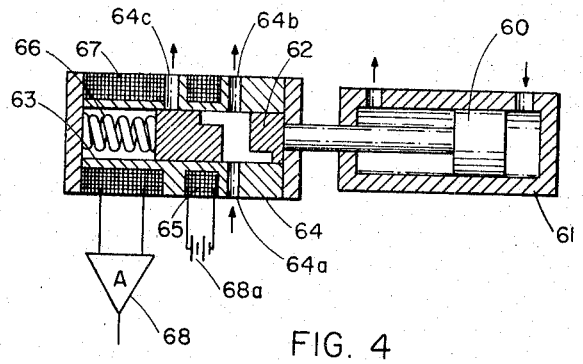
FIG. 4 is an axial cross-sectional view through another hydraulic signal generator.

In the apparatus shown in FIG. 4, a piston 60 is displaceable within a cylinder 61 by hydraulic fluid and shifts the valve member 62 within the bore 63 of a valve body 64 whose pressure inlet 64a can be selectively connected to outlet 64b and 64c upon displacement of valve member 62 by piston 60. The ferromagnetic valve member 62 is displaceable relatively to a fixedly positioned energizing coil 65, connected in circuit with a battery 66 to axially polarize the valve member 62. Displacement of the latter against the force of a restoring spring 66 results in the generation of a control pulse in an induction coil 67 surrounding the bore 63 and connected with an amplifier 68 as previously described.

Figure 5:
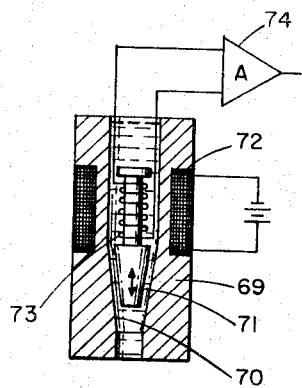
FIG. 5 is an axial cross-sectional view through a flow-responsive pulse-forming valve.
Figure 6:
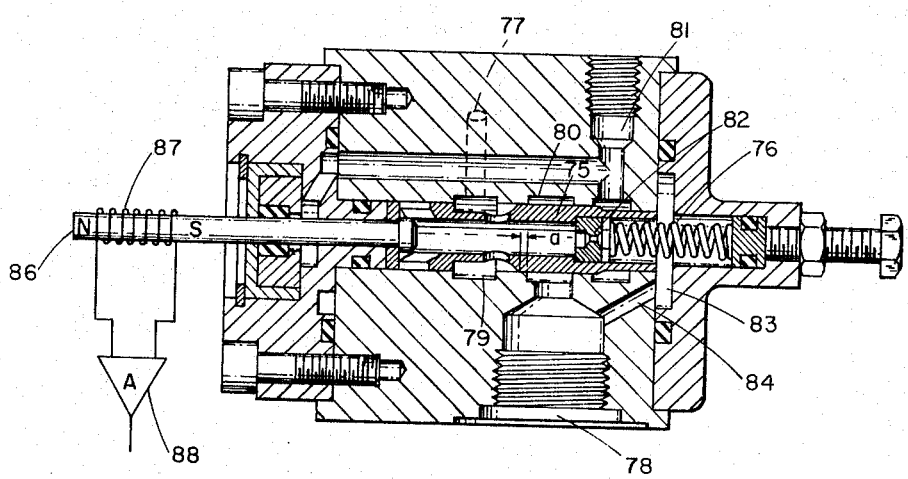
FIGS. 6 and 7 are axial cross-sectional views of hydraulic valve systems illustrating diagrammatically further modifications of the invention.
Figure 7:
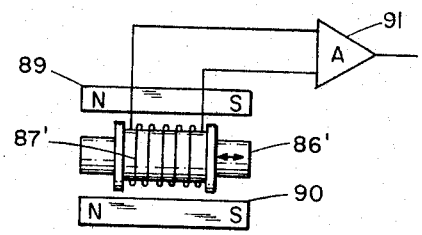

In the modification of FIG. 5 the valve body 69 has a frusto-conical valve seat 70 against which the frusto-conical valve member 71 is urged by gravity, this valve member being supported by a stream of hydraulic fluid and displaceable vertically in dependence upon the rate of flow of this fluid. An energizing coil 72 in the body 69 converts the latter into the magnetic member with respect to which the induction coil 73 carried by valve member 71 is displaceable. The induced current pulse is amplified at 74 and serves to operate a control system. In FIG. 6 there is shown a hydraulic valve, identical to that illustrated in the aforementioned commonly assigned copending application, whose valve member 75 is displaceable against the force of a spring 76 by the pressure differential developed between the pressure inlet 77 and the outlet 78. The valve member 75, upon movement through a distance a, effects communication between annular groove 79 connected with the inlet 77 and a groove 80 communicating with the outlet, a further part 81 being provided to convey leakage fluid to a sump. A throttle aperture 82 in valve member 75 admits fluid into a compartment 83 communicating with outlet 78 via passage 84. The valve member 75 reciprocates a permanently magnetized rod 86 with respect to a fixed induction coil 87 to generate control pulses which are amplified at 88. The structure schematically illustrated in FIG. 7 makes use of a rod 86', shifted by a control valve of the type illustrated in FIG. 6, which carries an induction coil 87' and displaces this coil with respect to fixed permanent magnets 88, 89, 90. Coil 87' supplies the generator pulses to an amplifier 91 in the usual manner. In the embodiments of FIGS. 4–7, the remainder of the hydraulic installation can be similar to that illustrated in FIG. 3.

The invention described and illustrated is believed to admit of many modifications within the ability of persons skilled in the art, all such modifications being considered within the spirit and scope of the appended claims.

What is claimed is:
1. A hydraulic installation comprising:
a source of fluid under pressure;
a fluid-responsive working element;
conduit means connecting said source with said working element;

hydraulically operable control means in hydraulic circuit with said conduit means for generating an electric signal responsive to the fluid pressure in said conduit means, said control means including a valve-body member provided with a longitudinal bore; a valve-closure member forming a floating piston reciprocable within said bore for controlling the flow of a fluid through said body member and displaceable by fluid traversing said body member, said valve-closure member being magnetically permeable; and an induction coil on the valve-body member in intersecting relationship with the magnetic field of the magnetically-permeable valve-closure member for inducing an electric signal in said coil upon displacement of said valve-closure member in said body member;

electromagnetic valve means in said conduit means energizable by the signal from said hydraulically operable control means for intermittently supplying fluid to said element, said valve means including at least one two-position reversing valve connected to said element for intermittently reversing the fluid flow thereto and a pair of respective electromagnets for shifting said reversing valve between extreme positions; and electronic switch means operatively connected with said control means and energizable thereby to activate said electromagnets alternately.

2. An installation as defined in claim 1, wherein said magnetically permeable member is a permanent magnet.

3. An installation as defined in claim 1, further comprising electric energizing means for magnetizing said magnetically permeable member.

4. A hydraulic installation comprising:
a source of fluid under pressure;
a fluid-responsive working element;
conduit means connecting said source with said working elements; a normally closed hydraulically openable control valve in said conduit means for passing fluid from said source to said working element, said control valve including a hydraulically reciprocable magnetizable member and substantially fixed induction-coil means surrounding said member for generating an electric signal upon displacement of said magnetizable member;

electromagnetic valve means in said conduit means energizable by said hydraulically operable control means for intermittently supplying fluid to said element, said valve means including at least one two-position reversing valve connected to said element for intermittently reversing the fluid flow thereto and a pair of respective electromagnets for shifting said reversing valve between extreme positions; and electronic switch means operatively connected with said control means and energizable thereby to activate said electromagnets alternately.

5. A hydraulic installation comprising:
a source of fluid under pressure;
a fluid-responsive working element;
conduit means connecting said source with said working element;
a normally closed hydraulically openable control valve in said conduit means for passing fluid from said source to said working element, said control valve including a longitudinally reciprocable magnetizable member hydraulically displaceable in one direction, substantially fixed induction-coil means surrounding said member for generating an electric signal upon displacement of said magnetizable member, and spring means bearing upon said magnetizable member in the opposite direction;

electromagnetic valve means in said conduit means energizable by said hydraulically operable control means for intermittently supplying fluid to said element, said valve means including at least one two-position reversing valve connected to said element for intermittently reversing the fluid flow thereto and a pair of respective electromagnets for shifting said reversing valve between extreme positions;

and electronic switch means operatively connected with said control means and energizable thereby to activate said electromagnets alternately.

References Cited
UNITED STATES PATENTS

| | | | |
|---|---|---|---|
| 1,490,901 | 4/1924 | Hendricks | 340—239 |
| 1,785,643 | 12/1930 | Noack et al. | 310—15 |
| 2,362,151 | 11/1944 | Pstenberg | 310—15 |
| 2,638,582 | 5/1953 | Urso et al. | 340—238 |
| 2,698,141 | 12/1954 | Dickey et al. | 137—100 |
| 2,777,425 | 1/1957 | Adams et al. | 91—275 |
| 2,803,110 | 8/1957 | Chittenden | 91—275 |
| 2,955,460 | 10/1960 | Stevens et al. | 91—275 |
| 3,046,951 | 7/1962 | Freeborn | 91—275 |
| 3,105,153 | 9/1963 | James | 310—15 |

FOREIGN PATENTS 1,342,553  9/1963  France.

MARTIN P. SCHWADRON, *Primary Examiner.*

SAMUEL LEVINE, *Examiner.*

P. E. MASLOUSKY, *Assistant Examiner.*